United States Patent
Susko

(10) Patent No.: US 10,589,639 B2
(45) Date of Patent: Mar. 17, 2020

(54) CATCHER PIN FOR DYNAMIC MANAGEMENT OF EXTERNAL LOADS

(71) Applicant: Ford Global Technologies, LLC, Dearborn, MI (US)

(72) Inventor: Thomas J. Susko, Saint Clair Shores, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 115 days.

(21) Appl. No.: 15/876,393

(22) Filed: Jan. 22, 2018

(65) Prior Publication Data

US 2019/0225117 A1    Jul. 25, 2019

(51) Int. Cl.
| | |
|---|---|
| B60N 2/015 | (2006.01) |
| B60N 2/07 | (2006.01) |
| B60N 2/42 | (2006.01) |
| B60N 2/427 | (2006.01) |
| B60N 2/06 | (2006.01) |

(52) U.S. Cl.
CPC ..... B60N 2/01575 (2013.01); B60N 2/01541 (2013.01); B60N 2/01583 (2013.01); B60N 2/065 (2013.01); B60N 2/0732 (2013.01); B60N 2/4221 (2013.01); B60N 2/42709 (2013.01); B60N 2/43 (2013.01)

(58) Field of Classification Search
CPC ........... B60N 2/01583; B60N 2/01541; B60N 2/01575; B60N 2/0732; B60N 2/4221; B60N 2/42709; B60N 2/065; B60N 2/43
USPC ........................................ 296/65.13
See application file for complete search history.

(56) References Cited

U.S. PATENT DOCUMENTS

| | | | |
|---|---|---|---|
| 6,513,873 B2 * | 2/2003 | Tsuda | B60N 2/10 297/253 |
| 6,773,069 B1 | 8/2004 | Kaneko et al. | |
| 6,843,460 B2 | 1/2005 | Koga et al. | |
| 7,717,487 B2 | 5/2010 | Kurokawa | |
| 8,806,936 B2 | 8/2014 | Suzuki et al. | |
| 9,114,741 B2 | 8/2015 | Nagata et al. | |
| 2006/0220411 A1 * | 10/2006 | Pathak | B60N 2/01541 296/65.11 |
| 2010/0270822 A1 | 10/2010 | Fujitsuka | |

* cited by examiner

Primary Examiner — Joseph D. Pape
Assistant Examiner — Dana D Ivey
(74) Attorney, Agent, or Firm — David Coppiellie; Price Heneveld LLP

(57) ABSTRACT

A vehicle seating assembly includes a frame rail having a rear catcher pin. A seat frame slidably engages the rear catcher pin at a lateral support. A head of the catcher pin is vertically offset from the seat frame in a static condition. During an impact condition, the seat frame deflects upward and engages the head of the catcher pin to define a dynamic structure condition.

20 Claims, 10 Drawing Sheets

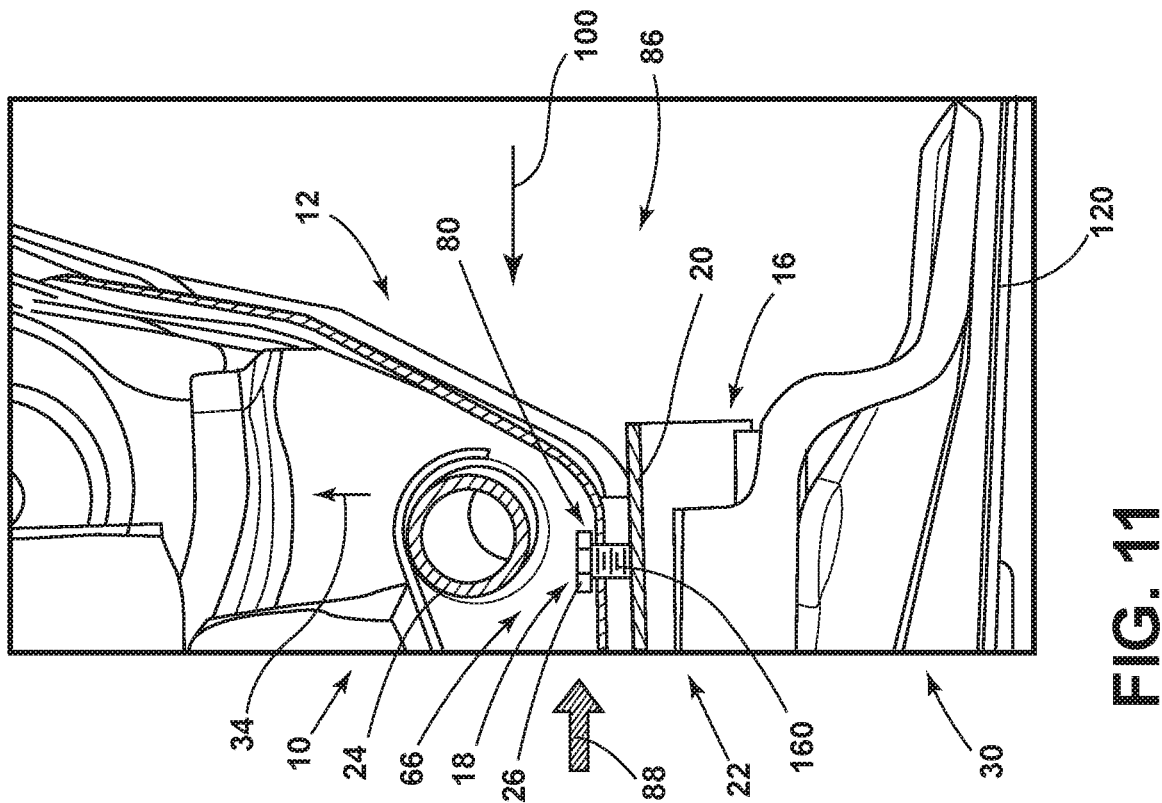
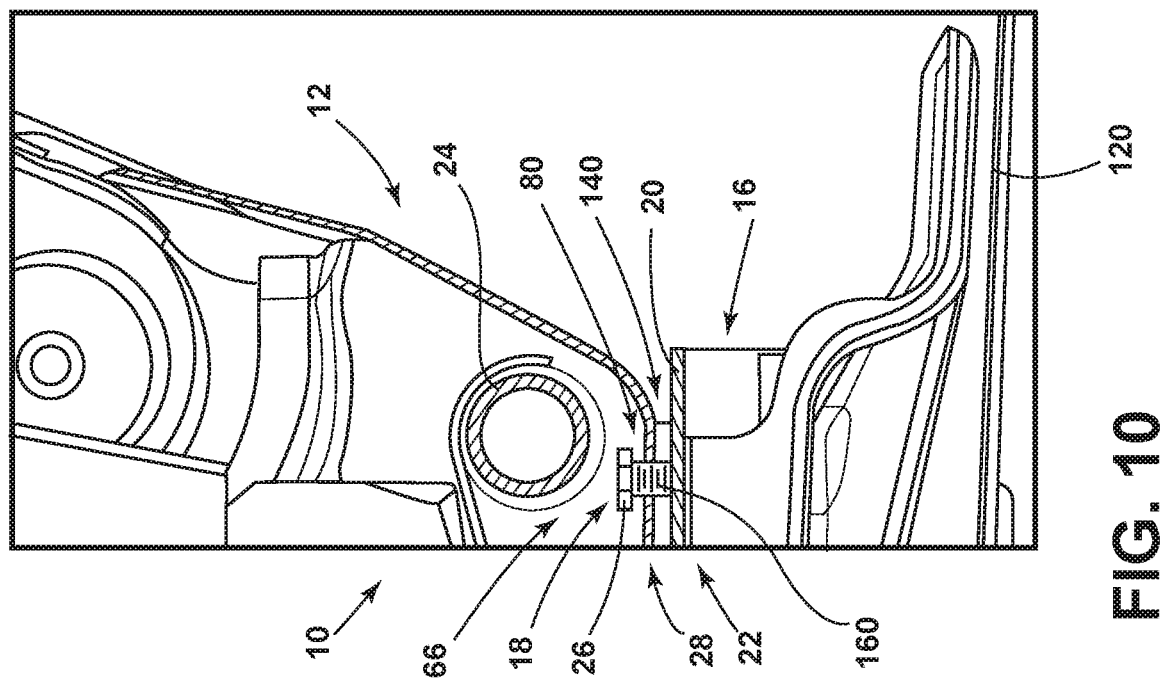

CATCHER PIN FOR DYNAMIC MANAGEMENT OF EXTERNAL LOADS

FIELD OF THE INVENTION

The present invention generally relates to vehicle seating, and more specifically, a catcher pin included within a vehicle seat for dynamically managing external loads experienced by the vehicle seat during various loading conditions.

BACKGROUND OF THE INVENTION

Within various seating assemblies, portions of the vehicle seat are attached to a vehicle frame. The design of these vehicle seats is intended to transfer various loading resulting from external forces from the seat into the vehicle frame so that a minimal amount of these external forces is transferred to the occupant within the vehicle.

SUMMARY OF THE INVENTION

According to one aspect of the present invention, a vehicle seating assembly includes a frame rail having a rear catcher pin. A seat frame slidably engages the rear catcher pin at a lateral support. A head of the catcher pin is vertically offset from the seat frame in a static condition. During an impact condition, the seat frame deflects upward and engages the head of the catcher pin to define a dynamic structure condition.

Embodiments of this aspect of the invention can include any one or combination of the following features:
 the seat frame includes a cushion side rail that includes a slot that receives the rear catcher pin
 the slot of the cushion side rail is positioned below the lateral support and the head of the catcher pin is substantially inaccessible in the static and dynamic structure conditions
 the dynamic structure condition is defined by a vertical deflection of the cushion side rail relative to the frame rail of a predefined vertical distance
 the slot is a keyhole slot disposed within a rear portion of the cushion side rail
 the cushion side rail is attached to the frame rail by a plurality of fasteners, wherein the plurality of fasteners are positioned within a middle portion of the cushion side rail
 the dynamic structure condition is further defined by the head of the catcher pin engaging the cushion side rail and supplementing the plurality of fasteners to maintain engagement between the frame rail and the cushion side rail
 the frame rail is attached to a portion of a vehicle frame According to another aspect of the present invention, a vehicle includes a frame rail attached to a vehicle frame. A side rail of a seat is attached to the frame rail at a substantially inaccessible region. A catcher pin slidably attaches the side rail to the frame rail within the substantially inaccessible region. The catcher pin includes a head that is offset from the side rail in a static condition and is engaged with the side rail in a dynamic structure condition.

Embodiments of this aspect of the invention can include any one or combination of the following features:
 the substantially inaccessible region is positioned under a lateral support of the seat, wherein the catcher pin slidably engages the side rail at a keyhole slot
 the side rail supports a cushion of the seat
 the catcher pin is fixedly attached to the frame rail at a rear portion of the frame rail
 the side rail is further attached to the frame rail with at least one fastener that is positioned within a middle portion of the side rail
 the dynamic structure condition is defined by a vertical deflection of the side rail relative to the frame rail until an underside of the head of the catcher pin engages a top surface of the side rail
 the static condition is defined by the side rail being vertically engaged on the frame rail by the at least one fastener, and wherein the dynamic structure condition is defined by the side rail being vertically engaged on the frame rail by the at least one fastener and the head of the catcher pin
 the catcher pin is a bolt that is attached to the frame rail According to another aspect of the present invention, a method of attaching a seat to a vehicle frame includes attaching a catcher pin to a rear section of a frame rail and sliding the catcher pin through a slot within a rear portion of a cushion side rail. The catcher pin is positioned beneath a lateral support of the seat, wherein the catcher pin is substantially inaccessible. The cushion side rail is secured to the frame rail via fasteners, wherein the fasteners are disposed within a middle portion of the cushion side rail, and wherein a head of the catcher pin is vertically offset from the rear portion of the cushion side rail to define a static condition.

Embodiments of this aspect of the invention can include any one or combination of the following features:
 the static condition of the catcher pin defines a gap between an underside of the head of the catcher pin and an upper surface of the cushion side rail
 the gap is configured to promote a predetermined deflection of the cushion side rail relative to the frame rail, wherein the predetermined deflection is substantially equal to the gap
 engagement of the underside of the head of the catcher pin with the upper surface of the cushion side rail defines a dynamic structure condition, wherein engagement of the catcher pin with the upper surface of the cushion side rail supplements the fasteners to maintain engagement of the cushion side rail with the frame rail These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 10 is a cross-sectional view of a vehicle seat frame that incorporates an aspect of the catcher pin and showing the catcher pin in a static condition;

FIG. 11 is a cross-sectional view of the seat frame of FIG. 10 and showing external loading moving the cushion side rail away from the static condition and toward the dynamic structure condition;

DETAILED DESCRIPTION OF THE PREFERRED EMBODIMENTS

Figure 1:
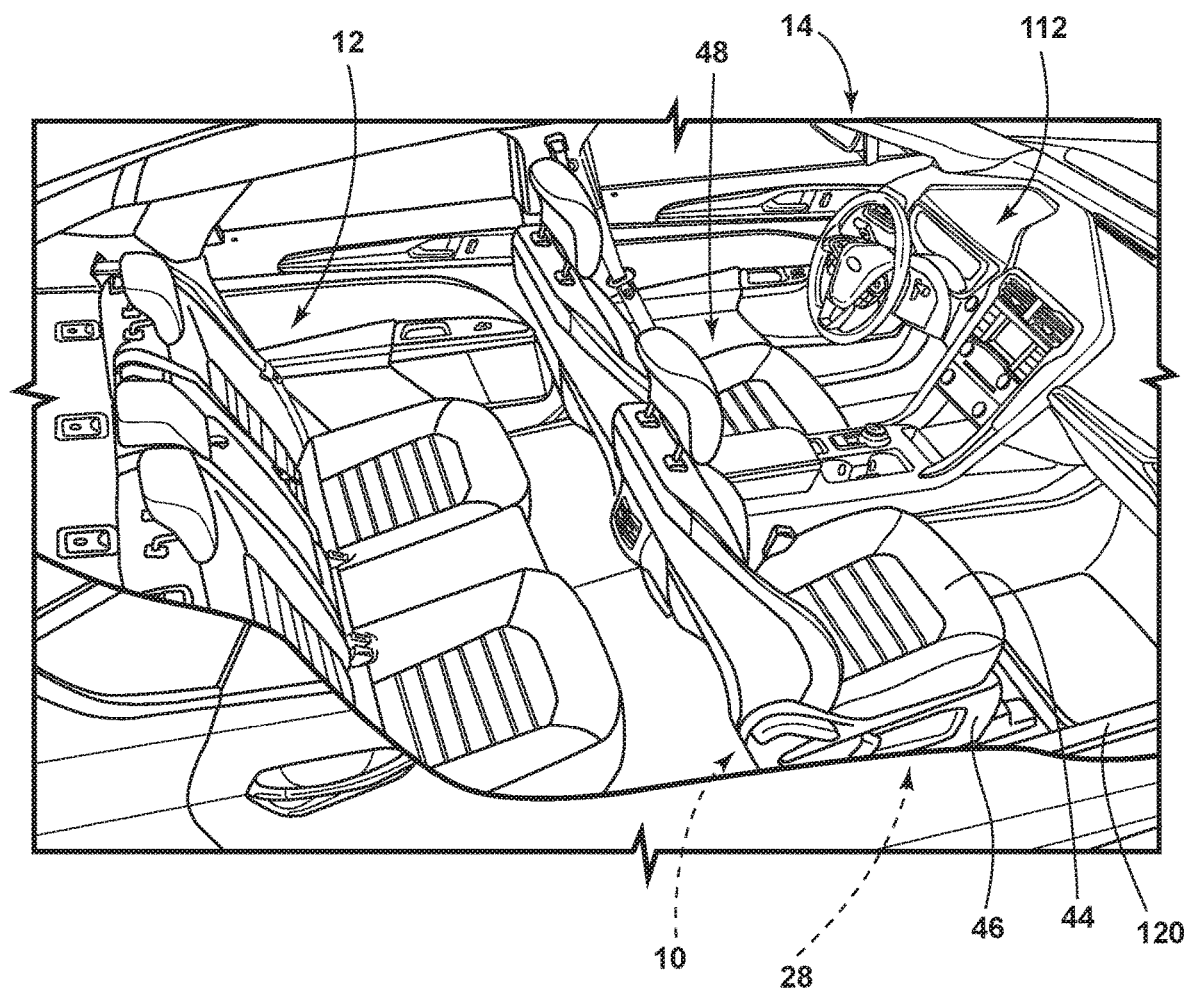
FIG. 1 is a side perspective view of a passenger cabin of a vehicle having seating assemblies that incorporate an aspect of the catcher pin for managing dynamic loads.
Figure 2:
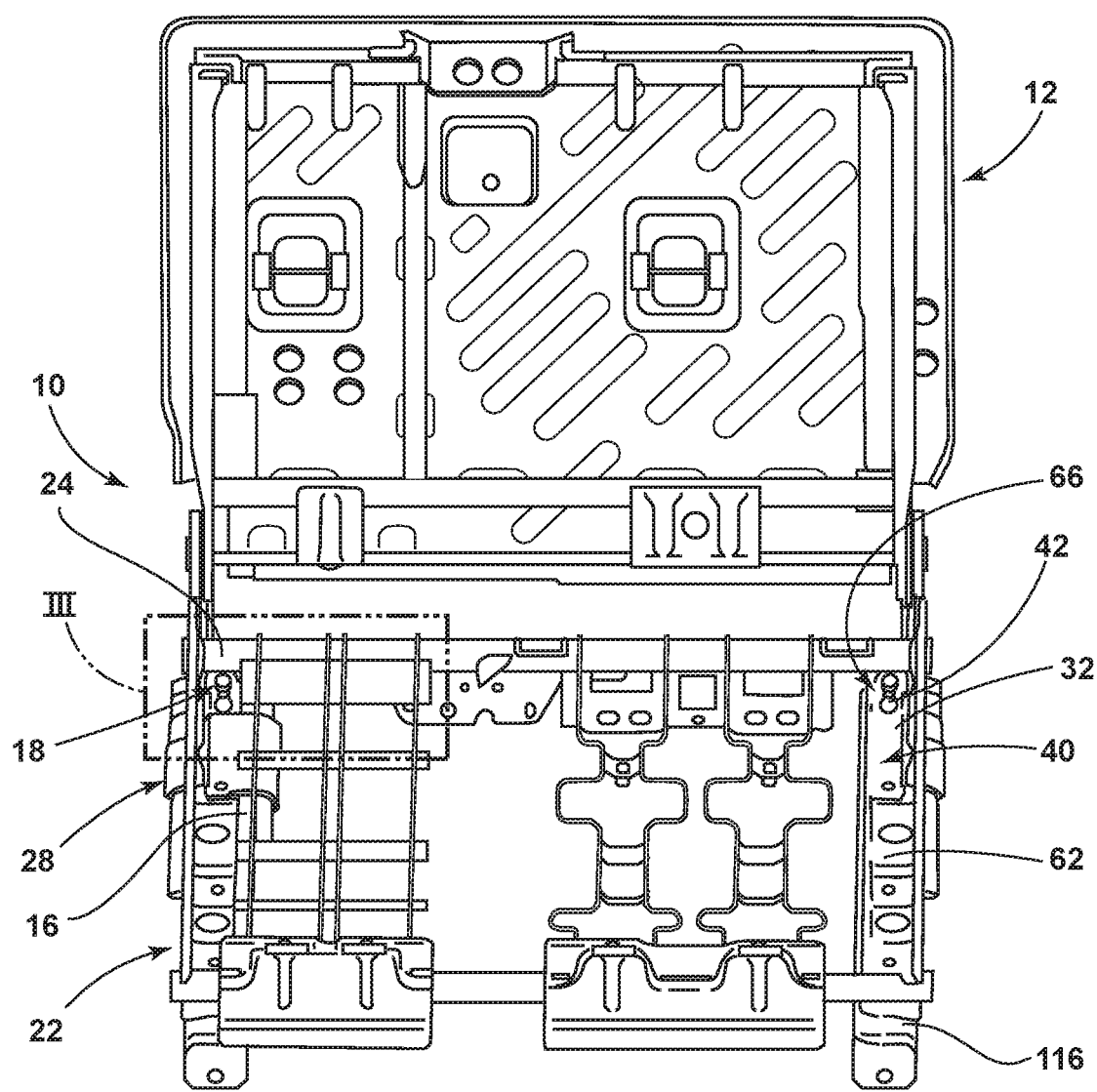
FIG. 2 is a front perspective view of a seat frame for a vehicle seating assembly that incorporates an aspect of the catcher pin within the seat frame.
Figure 3:
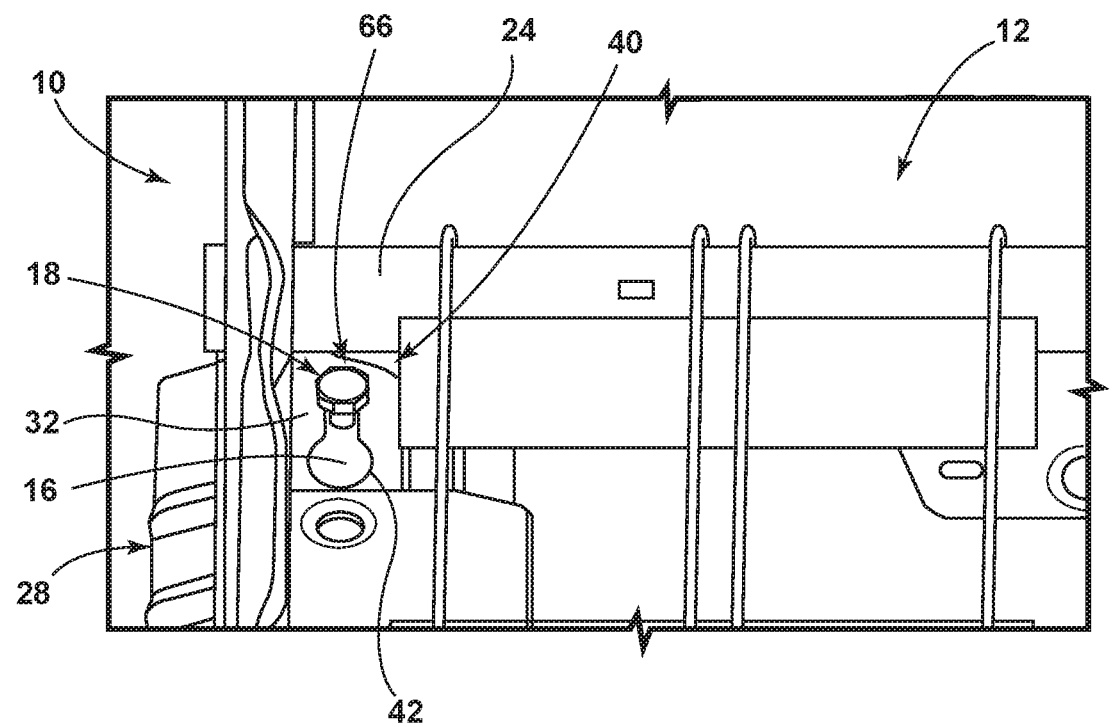
FIG. 3 is an enlarged perspective view of the seat frame of FIG. 2, taken at area III.
Figure 4:
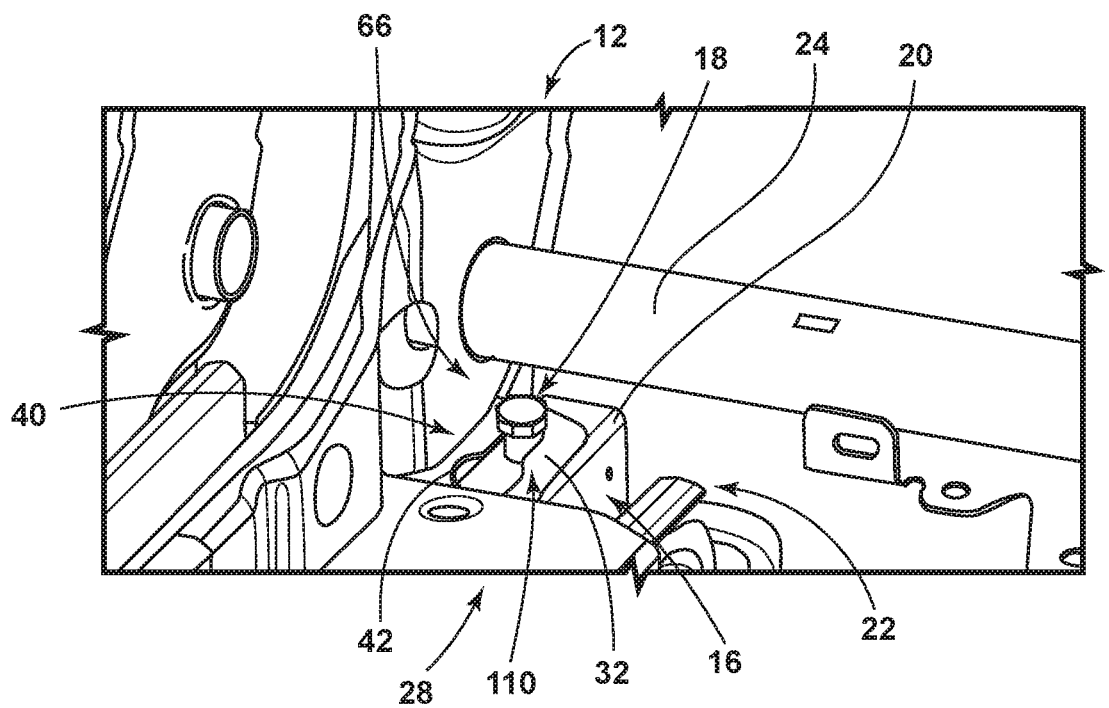
FIG. 4 is a side perspective view of an aspect of the catcher pin shown positioned within the seat frame and underneath the lateral support.
Figure 5:
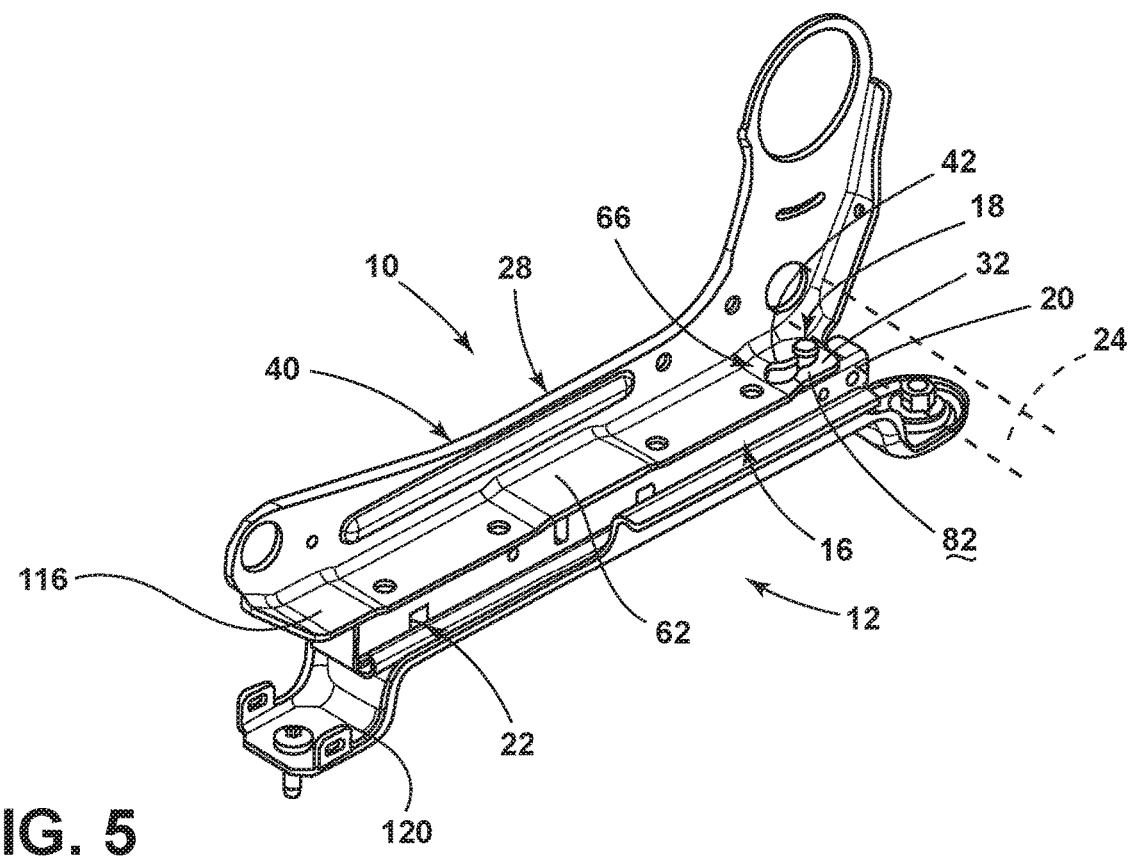
FIG. 5 is a top perspective view of the engagement between a frame rail and a cushion side rail that are at least partially coupled together using an aspect of the catcher pin.
Figure 6:
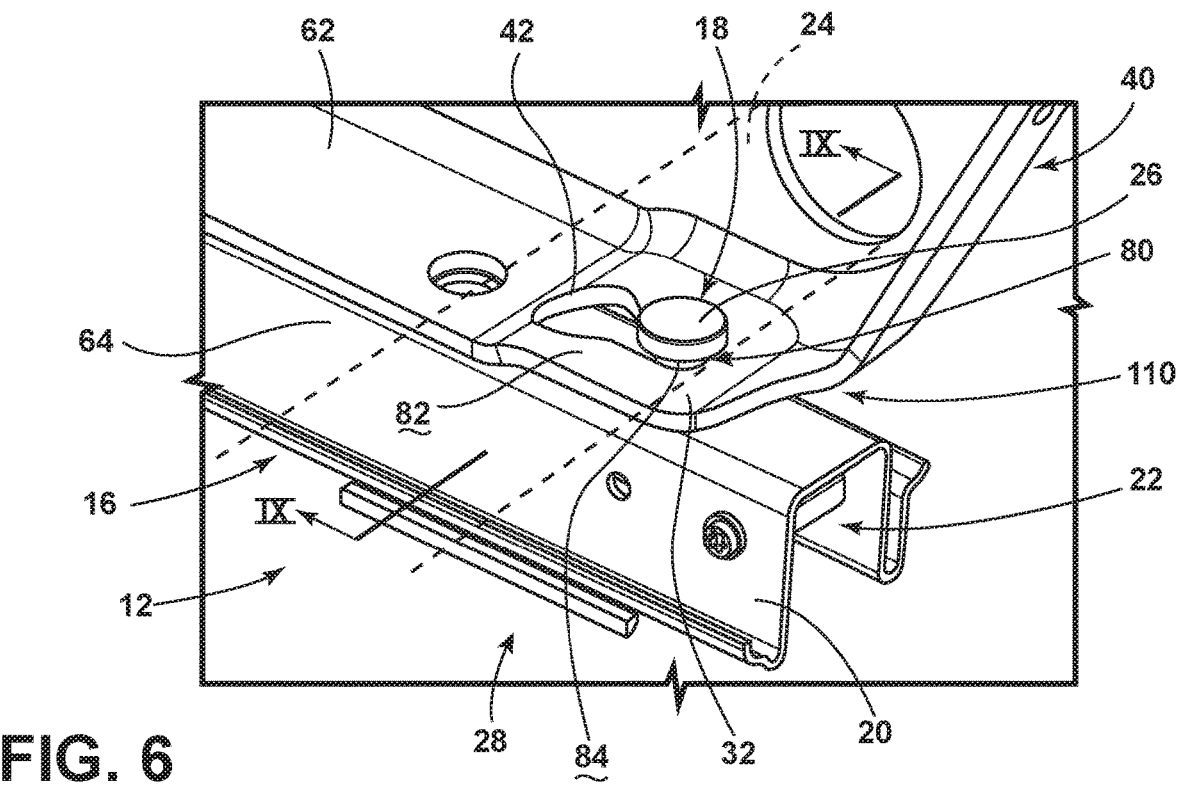
FIG. 6 is an enlarged perspective view of an aspect of the catcher pin extending between the frame rail and the cushion side rail.
Figure 7:
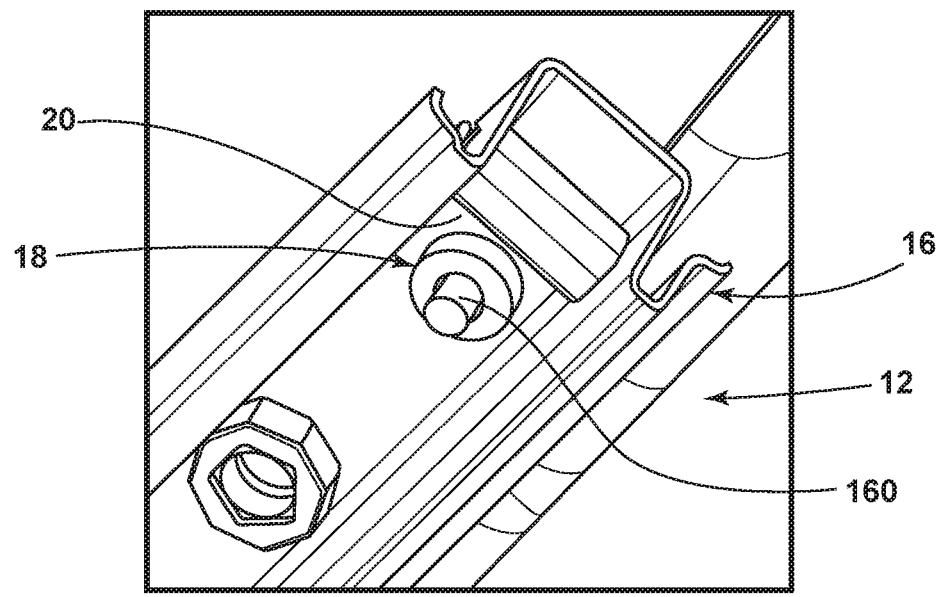
FIG. 7 is a bottom perspective view of the frame rail showing attachment of the catcher pin with the frame rail.
Figure 8:
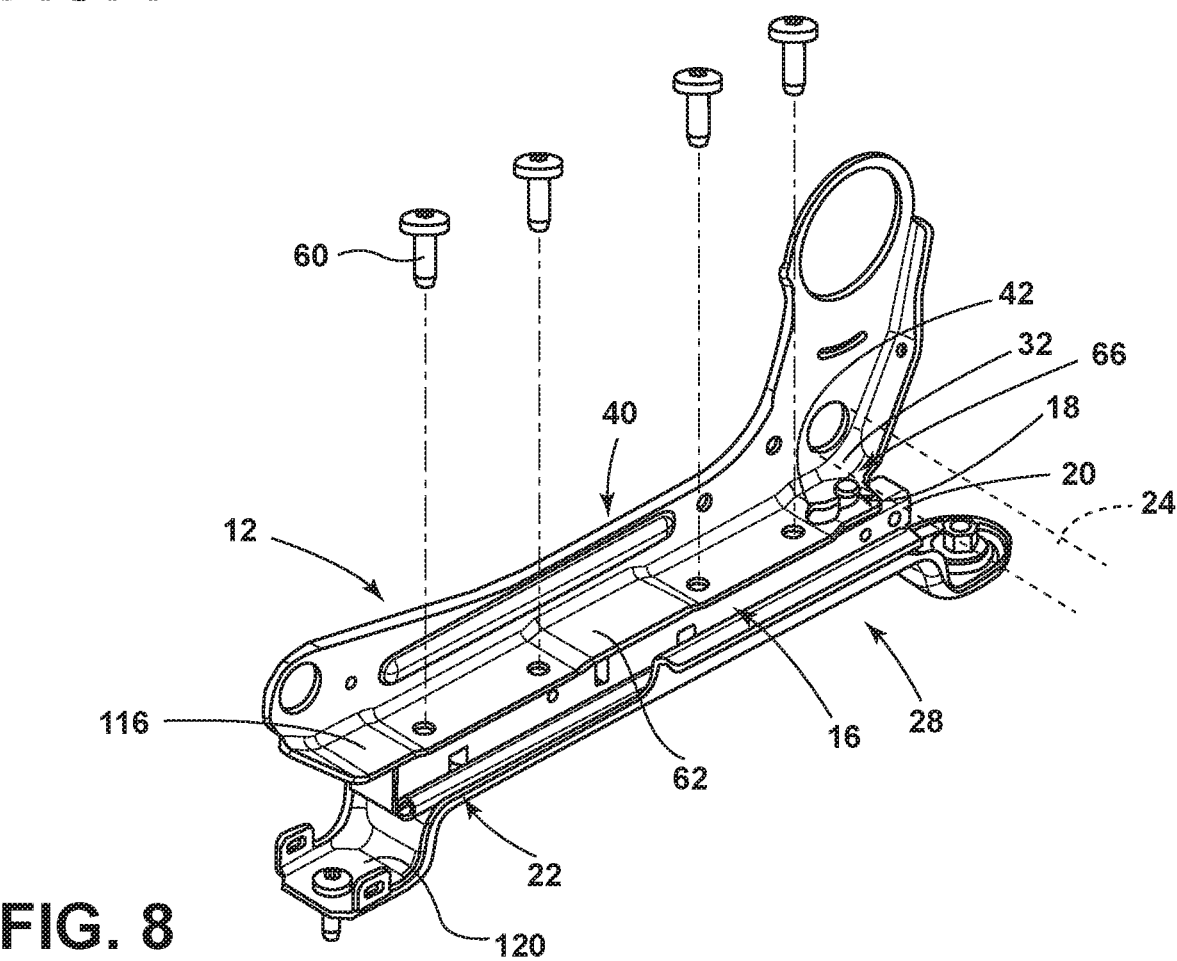
FIG. 8 is a top perspective view of the cushion side rail attached to the frame rail using a plurality of fasteners.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-14, reference numeral 10 generally refers to a seat frame incorporated within a seating assembly 12 for a vehicle 14. According to various aspects of the device, the seating assembly 12 for the vehicle 14 can include a frame rail 16 having a catcher pin 18 that is positioned near a rear section 20 of the frame rail 16. The frame rail 16 can be incorporated within a sliding mechanism 22 for the seating assembly 12. The seat frame 10 slidably engages the catcher pin 18 near and typically below a lateral support 24 for the seat frame 10. In this manner, the seat frame 10 can be attached to the frame rail 16 via the catcher pin 18 positioned at the rear section 20 of the frame rail 16. When the seat frame 10 is attached to the frame rail 16, a head 26 of the catcher pin 18 is vertically offset from the seat frame 10 to define a static condition 28 of the seat frame 10 and the catcher pin 18. During an impact condition 30 experienced by the vehicle 14, the rear portion 32 of the seat frame 10 is adapted to vertically deflect. The vertical deflection is generally upward. This upward deflection 34 of the seat frame 10 serves to engage a portion of the seat frame 10 with the head 26 of the catcher pin 18. This engagement between the seat frame 10 and the head 26 of the catcher pin 18 defines a dynamic structure condition 36 of the seat frame 10 and the catcher pin 18.

As exemplified in FIGS. 1-13, the portion of the seat frame 10 that attaches to the frame rail 16 can include a cushion side rail 40. According to various aspects of the device, the cushion side rail 40 can include a slot 42 that receives the catcher pin 18 to define each of the static and dynamic structure conditions 28, 36. Typically, a seating assembly 12 will include two cushion side rails 40 that flank a cushion 44 for the seating assembly 12. Each of these cushion side rails 40 is attached to a respective frame rail 16 that includes corresponding catcher pins 18. Accordingly, the catcher pins 18 for the frame rails 16 serve to support each side of the seating assembly 12 at the opposing cushion side rails 40 that flank the base 46 of the seating assembly 12. For purposes of this disclosure, the engagement between one frame rail 16, one catcher pin 18 and one cushion side rail 40 is described. It should be understood that this engagement is similar for each side of the seating assembly 12 disposed within each seating position 48 of the vehicle 14.

According to various aspects of the device as exemplified in FIGS. 2-14, the static condition 28 of the seat frame 10 is further defined by a plurality of fasteners 60 that extend through the cushion side rail 40 and attach a middle portion 62 of the cushion side rail 40 to a middle section 64 of the frame rail 16. When the cushion side rail 40 is attached to the frame rail 16, portions of the cushion side rail 40 are disposed underneath a lateral support 24 of the seat frame 10. Because the lateral support 24 of the seat frame 10 is positioned over the rear portion 32 of the cushion side rail 40, this rear portion 32 of the cushion side rail 40 defines a substantially inaccessible region 66 of the cushion side rail 40. Typically, this area would be substantially inaccessible to various tools for installing and/or tightening a fastener 60 between the rear portion 32 of the cushion side rail 40 and a rear section 20 of the frame rail 16. Utilizing the catcher pin 18 that extends through the slot 42 defined within the cushion side rail 40, the engagement between the catcher pin 18 and the cushion side rail 40 can be reinforced at this rear portion 32 of the cushion side rail 40 without the use of tools that typically cannot access this area.

As exemplified in FIGS. 2-10, in the static condition 28, the primary attachment mechanism between the cushion side rail 40 and the frame rail 16 is the one or more fasteners 60 that attach the middle portion 62 of the cushion side rail 40 to the middle section 64 of the frame rail 16. Under typical loading conditions that are experienced under typical driving conditions, these fasteners 60 are sufficient to maintain engagement between the cushion side rail 40 and a frame rail 16. As discussed above, in this static condition 28, a head 26 of the catcher pin 18 is positioned above the cushion side rail 40 by a predetermined vertical distance that defines a gap 80. This gap 80 is maintained throughout the existence of the static condition 28 during typical driving conditions. Additionally, as exemplified in FIGS. 11 and 12, under lesser external loads such as minimal impact forces 88, the rear portion 32 of the cushion side rail 40 may experience minimal upward deflection 34 towards the head 26 of the catcher pin 18, as shown in FIG. 13. Where this upward deflection 34 is less than the size of the gap 80, the main securing feature between the cushion side rail 40 and the frame rail 16 continues to be the plurality of fasteners 60 that attach the cushion side rail 40 to the frame rail 16. Where greater amounts of external forces are experienced, such as larger impact conditions 30, the rear portion 32 of the cushion side rail 40 may experience upward deflection 34 of a sufficient distance to define the dynamic structure condition 36 of the seat frame 10 and the catcher pin 18. In this dynamic structure condition 36, the upper surface 82 of the cushion side rail 40 at the rear portion 32 of the cushion side rail 40 engages an underside 84 of the head 26 of the catcher pin 18, as shown in FIG. 13. In this dynamic structure condition 36, the head 26 of the catcher pin 18 dynamically reinforces the seat frame 10 by supplementing the plurality of fasteners 60 that attach the cushion side rail 40 to the frame rail 16. This dynamic reinforcement 86 provided by the head 26 of the catcher pin 18 allows for a minimal upward deflection 34 of the cushion side rail 40 relative to the frame rail 16. This minimal amount of upward deflection 34 can serve to absorb at least a portion of the external impact force 88 experienced by the vehicle 14. Subsequently, when the cushion side rail 40 and the catcher pin 18 achieve the dynamic structure condition 36, the catcher pin 18 reinforces the structure of the seat frame 10 to prevent, or substantially prevent, additional deflection of the rear portion 32 of the cushion side rail 40 relative to the rear section 20 of the frame rail 16. The progression of upward deflection 34 of the cushion side rail 40 from the static condition 28—out of engagement with the head 26 of the catcher pin 18—and to the dynamic structure condition 36—into arrangement with the head 26—defines the dynamic management of the impact forces 88 experienced by the seating assembly 12.

Referring again to FIGS. 2-13, the placement of the catcher pin 18 at the rear portion 32 of the cushion side rail 40 and the rear section 20 of the frame rail 16 can prevent both upward deflection 34 and forward deflection 100 of the seat frame 10 beyond the dynamic structure condition 36. By placing the catcher pin 18 at the rear portion 32 of the cushion side rail 40, the dynamic structure condition 36 can resist greater amounts of moment and torque-type forces that may be experienced by a rear portion 32 of the seat frame 10. These greater amounts of moment and torque-type forces, in certain conditions, may be sufficient to overcome the retaining ability of the plurality of fasteners 60 that connect the cushion side rail 40 to the frame rail 16. The addition of the catcher pin 18 to the rear portion 32 of the frame rail 16 provides greater amounts of structural resistance to the upward deflection 34 that can be generated by the moment and torque-type forces. Additionally, these moment and torque-type forces are addressed in a dynamic fashion such that the external impact forces 88 experienced by the vehicle 14 can be at least partially absorbed by the movement of the cushion side rail 40 relative to the frame rail 16. The dynamic structure condition 36 of the catcher pin 18 and the cushion side rail 40 provides a subsequent dynamic reinforcement 86 to prevent additional deflection between these members of the seat frame 10.

As exemplified in FIGS. 2-4 and 10-14, the use of the catcher pin 18 being placed at a rear section 20 of the frame rail 16 provides an attachment location 110 within the inaccessible region 66 of the seat frame 10 beneath the lateral support 24 of the seat frame 10. Typically, this region of the seat frame 10 is a substantially inaccessible region 66 in each of the static and dynamic structure conditions 28, 36. The catcher pin 18 allows for a slidable engagement between the cushion side rail 40 and the catcher pin 18, either by hand and without the use of tools or using tools or other forms of mechanisms. Accordingly, the cushion side rail 40 can be manipulated from areas outside of the substantially inaccessible region 66 for slidably attaching the cushion side rail 40 to the catcher pin 18 via the keyhole slot 42 defined within the cushion side rail 40.

As exemplified in FIGS. 2-14, the cushion side rail 40 is attached to the frame rail 16 by the plurality of fasteners 60. As discussed above, the plurality of fasteners 60 are typically disposed within a middle portion 62 of the cushion side rail 40. One or more of these fasteners 60 can also be disposed within a forward portion 116 of the cushion side rail 40. The plurality of fasteners 60 are disposed through the cushion side rail 40 in areas outside of the substantially inaccessible region 66. The substantially inaccessible region 66 of the seat frame 10 is that portion near the lateral support 24 for the seat frame 10. As discussed above, this portion of the seat frame 10 is substantially inaccessible to tools that might be used to install, tighten or otherwise secure the fastener 60 between the cushion side rail 40 and the frame rail 16. Additionally, while it might be possible to insert a tool in this region, use of a tool in this region would be substantially inefficient such that the time and resources expended in placing a fastener 60 in this substantially inaccessible region 66 would typically be counterproductive. The use of the catcher pin 18 described above provides an efficient fastening attachment system for at least partially securing the cushion side rail 40 to the frame rail 16 within this substantially inaccessible region 66 of the seat frame 10.

Additionally, the frame rail 16 is typically part of a sliding mechanism 22 that attaches to a portion of the vehicle frame 120 to secure the seat frame 10 within the passenger cabin 112. Where no sliding mechanism 22 is present, the frame rail 16 can also attach directly to or be incorporated with the vehicle frame 120. The dynamic structure condition 36 allows for a minimal amount of upward deflection 34 between the cushion side rail 40 and the remainder of the seat frame 10 with respect to the frame rail 16 and the vehicle frame 120. This minimal amount of upward deflection 34 serves to absorb at least a portion of the external impact forces 88 experienced by the vehicle 14 during an impact condition 30.

Referring again to FIGS. 2-14, the frame rail 16 that includes the catcher pin 18 can be an upper portion of a sliding mechanism 22 for the seating assembly 12. The sliding mechanism 22 can attach to a frame member that is connected with the vehicle frame 120. The frame rail 16 can be a slidable member that is adapted to slide relative to the vehicle frame 120 to allow for lateral positioning of the seating assembly 12 within the passenger cabin 112. With the sliding mechanism 22, the frame rail 16 and the cushion side rail 40 are typically fixed with respect to one another. Accordingly, the catcher pin 18 of the frame rail 16 serves to maintain the position of the cushion side rail 40. During manufacture, the catcher pin 18 allows the frame rail 16 and the cushion side rail 40 to slide relative to one another when positioning the seat frame 10 within the passenger cabin 112.

Referring again to FIGS. 1-14, the vehicle 14 utilizing the catcher pin 18 can include the frame rail 16 that is attached to the vehicle frame 120, typically via a sliding mechanism 22. A portion of the seat frame 10, such as the cushion side rail 40, is attached to the frame rail 16 at the substantially inaccessible region 66 that is near the rear portion 32 of the cushion side rail 40 and under the lateral support 24 for the seat frame 10. The catcher pin 18 slidably attaches the cushion side rail 40 to the frame rail 16 within the substantially inaccessible region 66. As discussed previously, the catcher pin 18 includes a head 26 that is offset from the cushion side rail 40 in a static condition 28. After the vehicle 14 experiences an impact condition 30, the rear portion 32 of the cushion side rail 40 may experience an upward deflection 34 toward the head 26 of the catcher pin 18. In such a condition, referred to herein as the dynamic structure condition 36, the head 26 of the catcher pin 18 is engaging the cushion side rail 40. As discussed above, the dynamic structure condition 36 allows the head 26 of the catcher pin 18 to supplement the structure of the fasteners 60 that engage the cushion side rail 40 with the frame rail 16.

Figure 12:
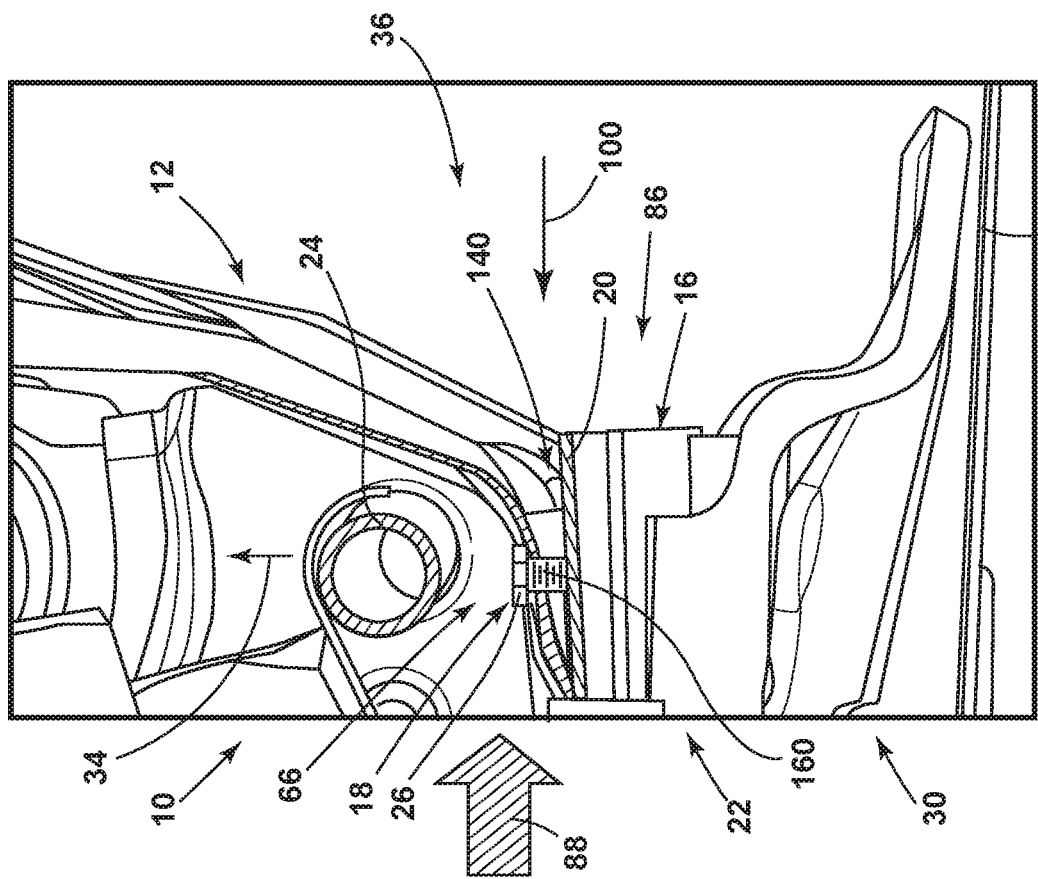
FIG. 12 is a cross-sectional view of the seat frame of FIG. 11 and showing the cushion side rail moving toward the dynamic structure condition.
Figure 13:
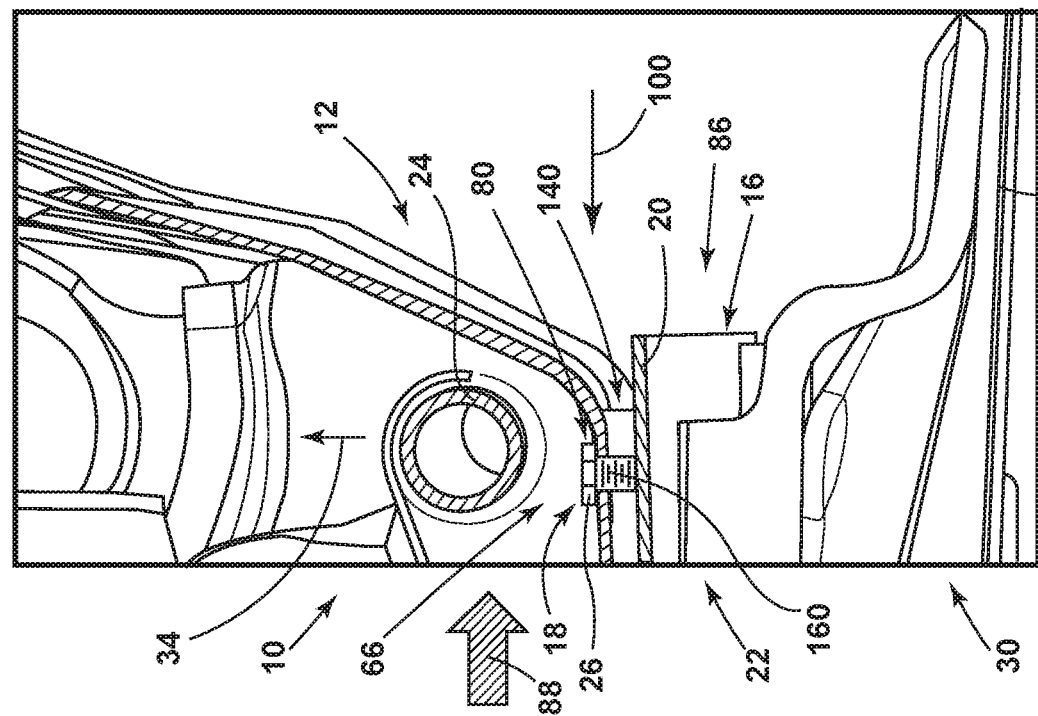
FIG. 13 is a cross-sectional view of the vehicle seat of FIG. 12 and showing the cushion side rail in the dynamic structure condition and in engagement with an underside of the head of the catcher pin.
Figure 14:
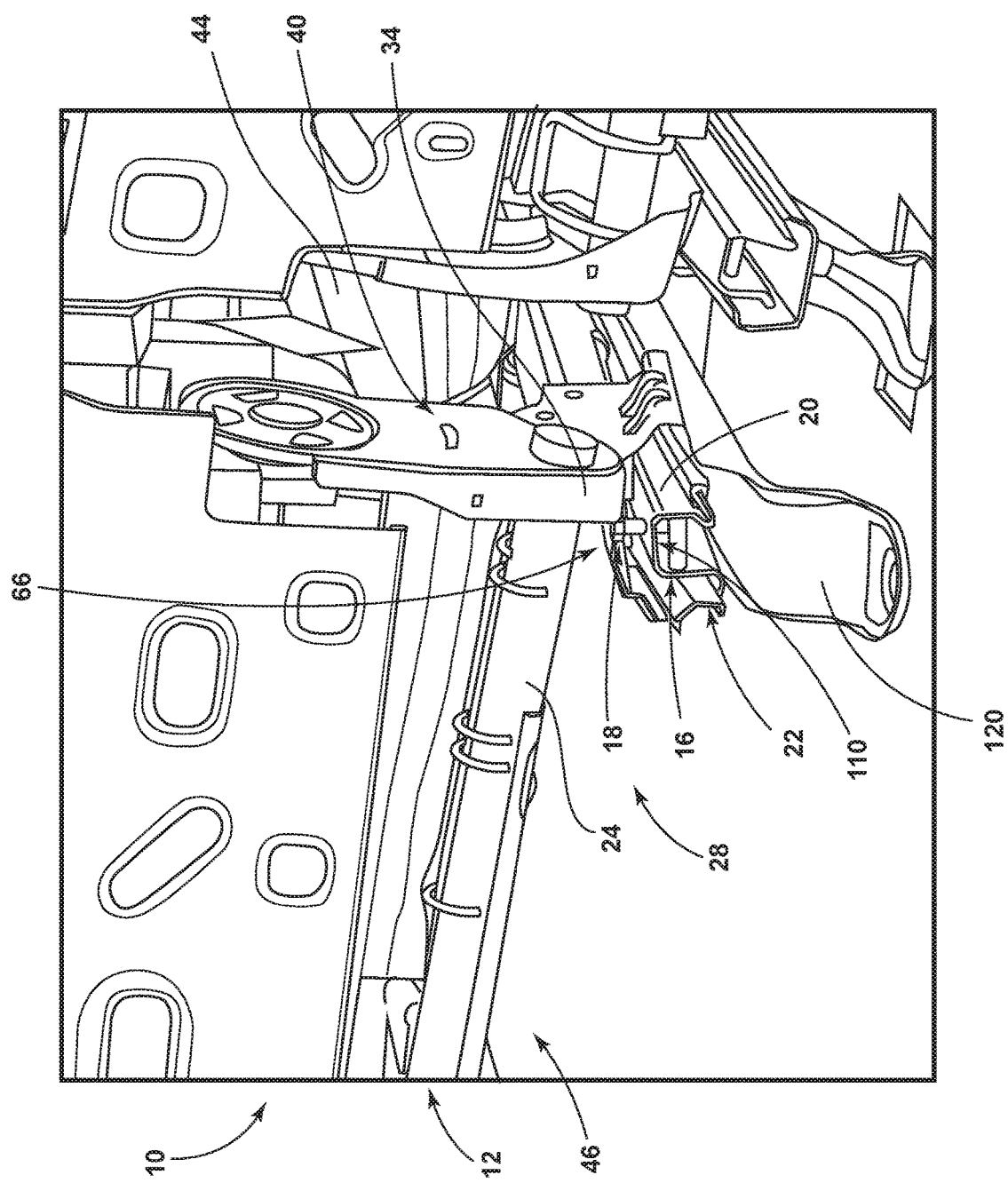
FIG. 14 is a rear perspective view of a vehicle seat frame and showing placement of the catcher pin beneath the lateral support for the vehicle seat.
Figure 15:
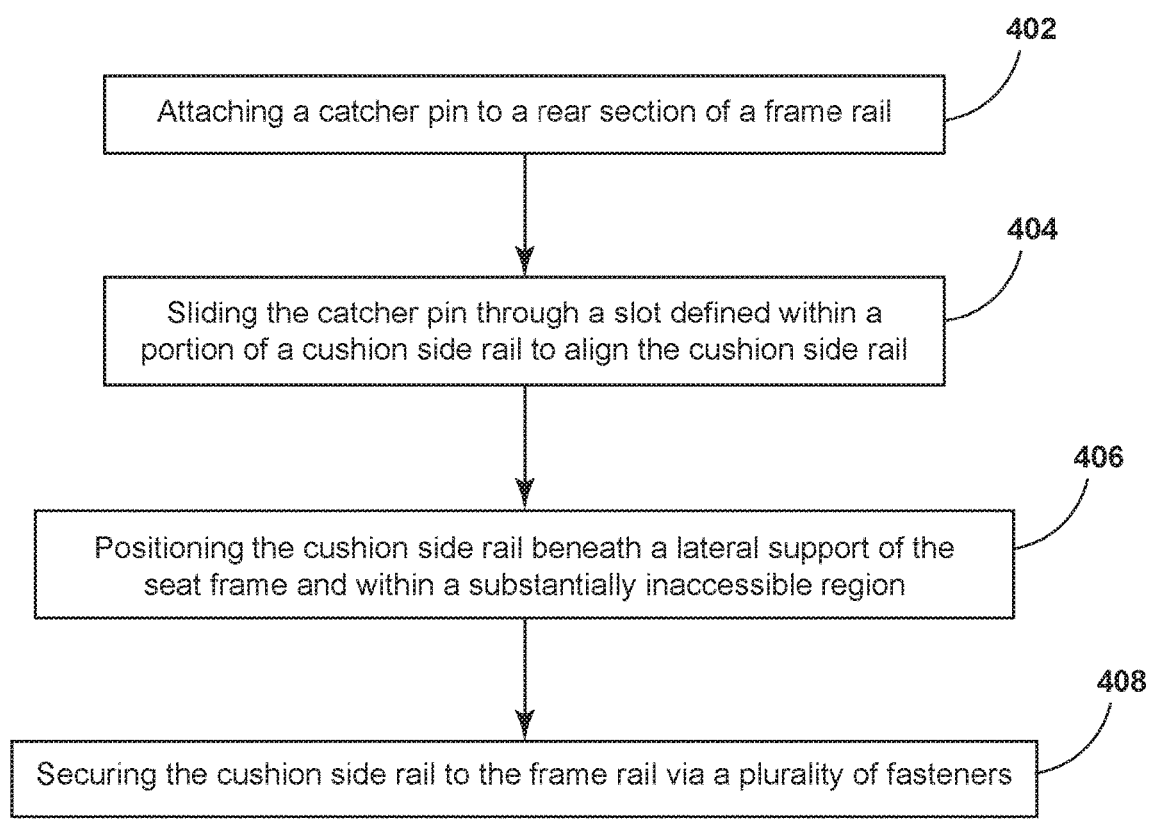
FIG. 15 is a linear flow diagram illustrating a method of attaching a vehicle seat to a vehicle frame utilizing an aspect of the catcher pin.

As exemplified in FIGS. 10-13, during an impact condition 30 experienced by the vehicle 14, the relationship between the catcher pin 18 and the cushion side rail 40 can be modified from the static condition 28 exemplified in FIG. 10 to the dynamic structure condition 36 exemplified in FIG. 13. FIGS. 11 and 12 each show a progression of upward deflection 34 of the cushion side rail 40 from the static condition 28 toward the dynamic structure condition 36. FIGS. 11 and 12 also show the results of an impact condition 30 experienced by the vehicle 14 that may be insufficient to cause upward deflection 34 of the cushion side rail 40 all the way into the dynamic structure condition 36. In each of these conditions exemplified in FIGS. 11 and 12, the fasteners 60 typically remain the primary structural support between the cushion side rail 40 and the frame rail 16. The catcher pin 18 is adapted to supplement the structure of the fasteners 60 when the vehicle 14 experiences an impact condition 30 sufficient to cause upward deflection 34 of the cushion side rail 40 into the dynamic structure condition 36. As discussed previously, in the dynamic structure condition 36, the head 26 of the catcher pin 18 provides dynamic and additional support to the cushion side rail 40 to prevent additional upward deflection 34 of the cushion side rail 40 beyond the dynamic structure condition 36. Again, this configuration of the catcher pin 18 and the cushion side rail 40 serves to at least partially absorb the impact forces 88 experienced by the vehicle 14 during an impact condition 30. These impact forces 88 may be the result of an extreme deceleration of forward movement as a result of a frontal impact. In such a frontal impact, the changed momentum of the vehicle 14 may result in the upward deflection 34 of the cushion side rail 40 with respect to the frame rail 16. The catcher pin 18 engages the cushion side rail 40 in the dynamic structure condition 36 to buttress and provide supplemental support to the plurality of fasteners 60 to prevent deflection of the cushion side rail 40 beyond or substantially beyond the dynamic structure condition 36.

As exemplified in FIGS. 2-9, the catcher pin 18 can be a bolt that is attached to the frame rail 16 near a rear section 20 of the frame rail 16. In this manner, the catcher pin 18 is fixedly attached to the frame rail 16 and serves as an attachment location 110 for the rear portion 32 of the cushion frame rail 16 for the seat frame 10.

As exemplified in FIGS. 10-13, the static condition 28 of the seat frame 10 and the catcher pin 18 is typically defined by the cushion side rail 40 being engaged on the frame rail 16 using one or more fasteners 60. As discussed above, in the static condition 28, the at least one fastener 60 and typically a plurality of fasteners 60 serve as the primary structural attachment feature between the cushion side rail 40 and the frame rail 16. When the system is moved to the dynamic structure condition 36, the dynamic structure condition 36 is defined by the cushion side rail 40 undergoing an upward deflection 34 and being vertically engaged on the frame rail 16 by the fasteners 60 and the head 26 of the catcher pin 18. Again, due to the impact forces 88 experienced by the vehicle 14 in an impact condition 30, the movement of the cushion side rail 40 from the static condition 28 and into the dynamic structure condition 36 helps to absorb at least a portion of these impact forces 88. Once in the dynamic structure condition 36, the head 26 of the catcher pin 18 buttresses the fasteners 60 and provides added integrity to the connection between the cushion side rail 40 and the frame rail 16. This deflection experienced by the cushion side rail 40 can be in the form of a motion in a generally vertical direction. This motion can also be in the form of a rotational deflection where the rear portion 32 of the cushion side rail 40 deflects upward and a forward portion 116 of the cushion side rail 40 (shown in FIG. 8) either maintains its position or deflects at least partially downward. This can result in the moment or torque-type forces that are experienced by the seat frame 10 during the impact condition 30 experienced by the vehicle 14.

Figure 9:
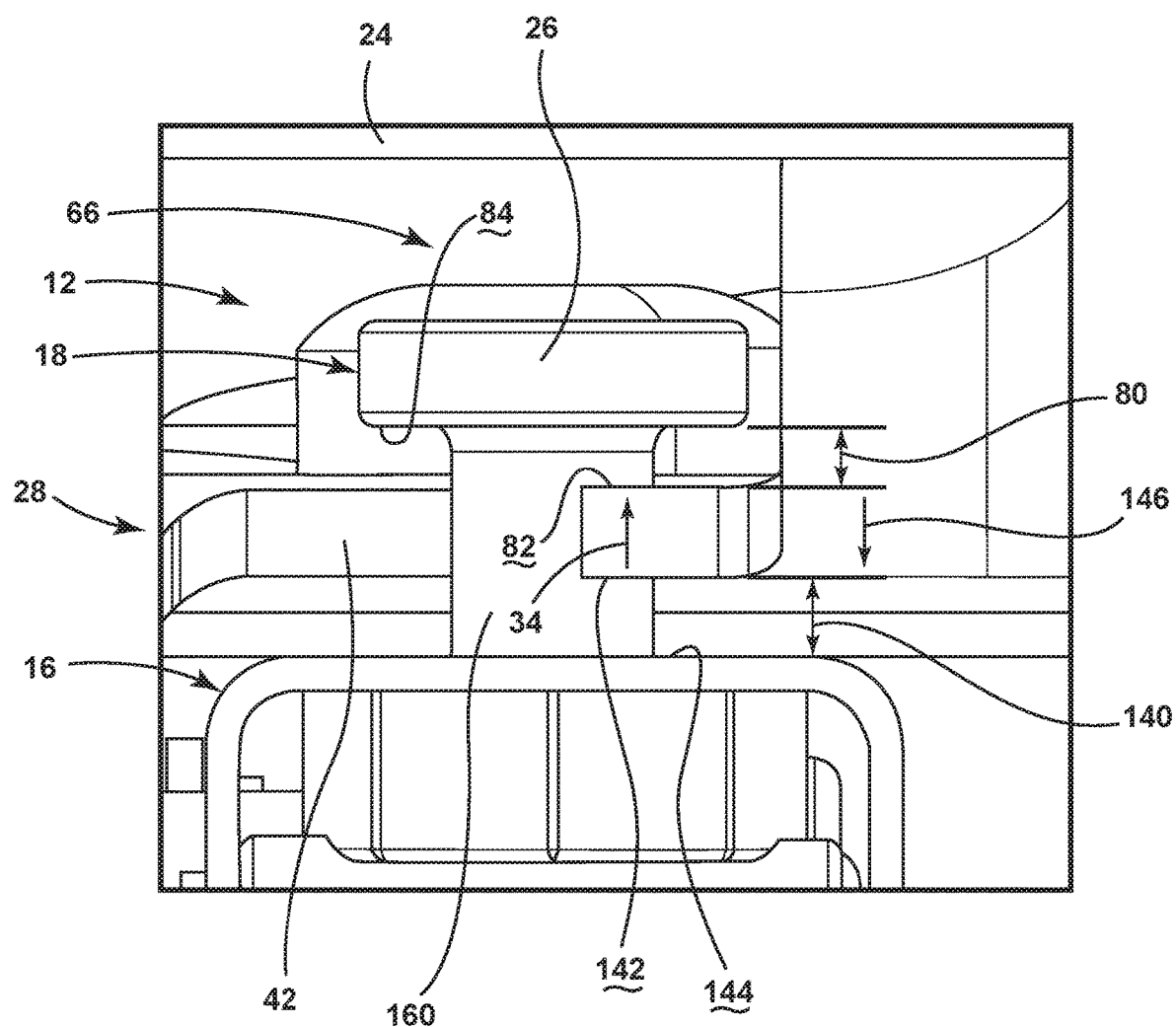
FIG. 9 is a cross-sectional view of the catcher pin of FIG. 6 taken along line IX-IX.

As exemplified in FIG. 9, in the static condition 28, the catcher pin 18 can define a gap 80 between the head 26 of the catcher pin 18 and the upper surface 82 of the cushion side rail 40. This gap 80 between the underside 84 of the head 26 of the catcher pin 18 and the upper surface 82 of the cushion side rail 40 typically defines the amount of upward deflection 34 experienced by the cushion side rail 40 as the cushion side rail 40 moves between the static condition 28 and the dynamic structure condition 36. This distance of the gap 80 can vary depending upon the seating position 48 of the vehicle 14 within the passenger cabin 112, the type of vehicle 14, the type of seating assembly 12, and other factors that can bear on the amount of impact forces 88 that are transferred to the seat frame 10 during an impact condition 30 and during typical operating conditions of the vehicle 14. According to various aspects of the device, a secondary gap 140 can exist between a lower surface 142 of the cushion side rail 40 and the top surface 144 of the frame rail 16. This secondary gap 140 can be used to at least partially absorb forces that may be experienced during a rear impact condition 30 when the seat might be caused to deflect in a generally downward direction 146 near the rear portion 32 of the cushion side rail 40.

Referring now to FIGS. 1-15, having described various aspects of the seating assembly 12 that includes the catcher pin 18 used to attach the cushion side rail 40 to the frame rail 16, a method 400 is disclosed for attaching a seat frame 10 to a vehicle frame 120 utilizing an aspect of the catcher pin 18. According to the method 400, a catcher pin 18 is attached to a rear section 20 of the frame rail 16 (step 402). As discussed above, the catcher pin 18 can be in the form of a bolt that is attached to the frame rail 16. It is also contemplated that the catcher pin 18 can be a rivet, stamped member or other similar structural member that is welded or otherwise affixed to the frame rail 16. In various aspects of the device, the catcher pin 18 can be a formed portion of the frame rail 16 that is integrally formed as part of the frame rail 16. The catcher pin 18 is adapted to provide sufficient structural integrity to absorb at least a portion of the impact forces 88 experienced during an impact condition 30 and to maintain the rear portion 32 of the cushion side rail 40 within the dynamic structure condition 36. According to the method 400, the cushion side rail 40 is attached to the frame rail 16 by sliding the catcher pin 18 through a slot 42 defined within the rear portion 32 of the cushion side rail 40 (step 404). By sliding the catcher pin 18 through the slot 42, the cushion side rail 40 is positioned and at least partially secured to the catcher pin 18 beneath a lateral support 24 of the seat frame 10 (step 406). In this position, the catcher pin 18 is within a substantially inaccessible region 66 defined between the lateral member of the seat frame 10 and the rear portion 32 of the cushion side rail 40. The cushion side rail 40 is then secured to the frame rail 16 via fasteners 60 (step 408). The fasteners 60 are disposed within a middle portion 62 of the cushion side rail 40 and extend into a middle section 64 of the frame rail 16. The head 26 of the catcher pin 18 is vertically offset from the rear portion 32 of the cushion side rail 40 to define the static condition 28. As discussed above, the static condition 28 of the catcher pin 18 defines a gap 80 between the underside 84 of the head 26 of the catcher pin 18 and an upper surface 82 of the cushion side rail 40. This gap 80 is configured to promote a predetermined deflection of the cushion side rail 40 relative to the frame rail 16. This predetermined deflection is substantially equal to the gap 80 defined between the catcher pin 18 and the cushion side rail 40.

According to various aspects of the device, the engagement of the underside 84 of the head 26 of the catcher pin 18 with the upper surface 82 of the cushion side rail 40 defines the dynamic structure condition 36. Engagement of the catcher pin 18 with the upper surface 82 of the cushion side rail 40 supplements the fasteners 60 to maintain engagement of the cushion side rail 40 with the frame rail 16. This engagement serves to prevent, or substantially prevent, deflection beyond the dynamic structure condition 36.

According to various aspects of the device, the catcher pin 18 can be incorporated within various seating positions 48 of the vehicle 14. Such seating positions 48 can include, but are not limited to, front seating positions, rear seating positions, third-row seating positions, Captain's chairs, bench seating, and other similar seating positions 48 and seating types within a passenger cabin 112 of a vehicle 14.

In various aspects of the device, the catcher pin 18 can be incorporated within various vehicle types. These vehicle types can include, but are not limited to, sedans, coupes, pick-up trucks, SUVs, cargo vans, mini vans, seating for mass transit vehicles, and other similar vehicle settings.

When the seat frame 10 and the catcher pin 18 are within the dynamic structure condition 36, the catcher pin 18 may undergo minimal deflection to absorb greater amounts of the force experienced by the vehicle 14 in the impact condition 30. In this aspect of the device, the catcher pin 18 supplements the resistance to deflection for the seat frame 10 and allows more of the impact forces 88 experienced by the vehicle 14 to be absorbed within the seat frame 10 upon deflection of the catcher pin 18 relative to the frame rail 16.

According to various aspects of the device, the lateral support 24 can extend between opposing cushion side rails 40. In such an embodiment, the lateral support 24 can extend through at least a portion of each of the opposing cushion side rails 40 so that the lateral support 24 is maintained in position over the cushion side rail 40 to define the substantially inaccessible region 66 of the seat frame 10. In various aspects of the device, the catcher pin 18 can have different sizes depending upon the amount of force that the catcher pin 18 is adapted to withstand during the dynamic structure condition 36. According to various aspects of the device, the catcher pin 18 can be in the form of a shear pin having a post 160 that extends upward to the head 26 of the catcher pin 18. The post 160 and the head 26 of the catcher pin 18 cooperate to be selectively inserted into the keyhole slot 42 defined within the cushion side rail 40. Once properly inserted in the keyhole slot 42, the head 26 prevents the cushion side rail 40 from being vertically removed over the catcher pin 18. During assembly of the vehicle 14, the engagement between the catcher pin 18 and the keyhole slot 42 of the cushion side rail 40 provides a positioning mechanism that slidably aligns the frame rail 16 and the cushion side rail 40 to assist in locating the fasteners 60 for attaching the cushion side rail 40 to the frame rail 16 for the seating assembly 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly comprising:
   a frame rail having a rear catcher pin; and
   a seat frame that slidably engages the rear catcher pin at a lateral support; wherein a head of the rear catcher pin is vertically offset from the seat frame in a static condition; and
   during an impact condition, the seat frame deflects upward as a result of an impact force defined by an extreme deceleration, wherein the seat frame engages the head of the rear catcher pin to define a dynamic structure condition.

2. The vehicle seating assembly of claim 1, wherein the seat frame includes a cushion side rail that includes a slot that receives the rear catcher pin.

3. The vehicle seating assembly of claim 2, wherein the slot of the cushion side rail is positioned below the lateral support and the head of the rear catcher pin is substantially inaccessible in the static and dynamic structure conditions.

4. The vehicle seating assembly of claim 2, wherein the dynamic structure condition is defined by a vertical deflection of the cushion side rail relative to the frame rail of a predefined vertical distance.

5. The vehicle seating assembly of claim 2, wherein the slot is a keyhole slot disposed within a rear portion of the cushion side rail.

6. The vehicle seating assembly of claim 5, wherein the cushion side rail is attached to the frame rail by a plurality of fasteners, wherein the plurality of fasteners are positioned within a middle portion of the cushion side rail.

7. The vehicle seating assembly of claim 6, wherein the dynamic structure condition is further defined by the head of the rear catcher pin engaging the cushion side rail and supplementing the plurality of fasteners to maintain engagement between the frame rail and the cushion side rail.

8. The vehicle seating assembly of claim 1, wherein the frame rail is attached to a portion of a vehicle frame.

9. A vehicle comprising:
   a frame rail attached to a vehicle frame;
   a side rail of a seat that is attached to the frame rail at a substantially inaccessible region; and
   a catcher pin that slidably attaches the side rail to the frame rail within the substantially inaccessible region, and having a head that is offset from the side rail in a static condition and engaged with the side rail in a dynamic structure condition that is indicative of an extreme deceleration during an impact condition.

10. The vehicle of claim 9, wherein the substantially inaccessible region is positioned under a lateral support of the seat, wherein the catcher pin slidably engages the side rail at a keyhole slot.

11. The vehicle of claim 9, wherein the side rail supports a cushion of the seat.

12. The vehicle of claim 9, wherein the catcher pin is fixedly attached to the frame rail at a rear portion of the frame rail.

13. The vehicle of claim 9, wherein the side rail is further attached to the frame rail with at least one fastener that is positioned within a middle portion of the side rail.

14. The vehicle of claim 13, wherein the dynamic structure condition is defined by a vertical deflection of the side rail relative to the frame rail until an underside of the head of the catcher pin engages a top surface of the side rail.

15. The vehicle of claim 14, wherein the static condition is defined by the side rail being vertically engaged on the frame rail by the at least one fastener, and wherein the dynamic structure condition is defined by the side rail being vertically engaged on the frame rail by the at least one fastener and the head of the catcher pin.

16. The vehicle of claim 9, wherein the catcher pin is a bolt that is attached to the frame rail.

17. A method of attaching a seat to a vehicle frame, the method comprising steps of:
   attaching a catcher pin to a rear section of a frame rail;
   sliding the catcher pin through a slot within a rear portion of a cushion side rail;
   positioning the catcher pin beneath a lateral support of the seat, wherein the catcher pin is substantially inaccessible;
   securing the cushion side rail to the frame rail via fasteners, wherein the fasteners are disposed within a middle portion of the cushion side rail, and wherein a head of the catcher pin is vertically offset from the rear portion of the cushion side rail to define a gap that is indicative of a static condition, wherein the gap is configured to at least partially absorb an impact force resulting from an extreme deceleration during an impact condition.

18. The method of claim 17, wherein the static condition of the catcher pin defines the gap between an underside of the head of the catcher pin and an upper surface of the cushion side rail.

19. The method of claim 18, wherein the gap is configured to provide for a predetermined deflection distance of the cushion side rail relative to the frame rail during the impact condition, wherein the predetermined deflection distance is substantially equal to the gap between the underside of the head of the catcher pin and the upper surface of the cushion side rail.

20. The method of claim 19, wherein engagement of the underside of the head of the catcher pin with the upper surface of the cushion side rail during the impact condition defines a dynamic structure condition, wherein engagement of the catcher pin with the upper surface of the cushion side rail structurally reinforces the fasteners to maintain engagement of the cushion side rail with the frame rail during and after the impact condition.

\* \* \* \* \*